United States Patent
Pochy

(10) Patent No.: US 8,044,775 B2
(45) Date of Patent: Oct. 25, 2011

(54) RFID SYSTEM FOR IDENTIFYING LOCATION OF SENSORS/INDICATORS

(75) Inventor: Rocco D. Pochy, Fremont, CA (US)

(73) Assignee: Lighthouse Worldwide Solutions, Inc., Fremont, CA (US)

( * ) Notice: Subject to any disclaimer, the term of this patent is extended or adjusted under 35 U.S.C. 154(b) by 385 days.

(21) Appl. No.: 12/416,766

(22) Filed: Apr. 1, 2009

(65) Prior Publication Data

US 2009/0243807 A1   Oct. 1, 2009

Related U.S. Application Data

(60) Provisional application No. 61/041,492, filed on Apr. 1, 2008.

(51) Int. Cl.
*H04Q 5/22* (2006.01)

(52) U.S. Cl. .......... 340/10.5; 340/572.1; 340/10.1; 709/225

(58) Field of Classification Search ........... 340/572.1, 340/10.1, 10.5; 709/225
See application file for complete search history.

(56) References Cited

U.S. PATENT DOCUMENTS

| | | | |
|---|---|---|---|
| 7,119,899 B2 * | 10/2006 | Pochy et al. | 356/338 |
| 7,502,110 B2 * | 3/2009 | Saunders et al. | 356/336 |
| 7,880,874 B2 * | 2/2011 | Pochy | 356/237.2 |

* cited by examiner

*Primary Examiner* — Travis Hunnings
(74) *Attorney, Agent, or Firm* — Michael L. Greenberg, Esq.; Greenberg & Lieberman, LLC

(57) ABSTRACT

A system of identifying the source location that a particle counter is using to draw its data from. The present invention includes a transmitting sensor placed at the location of interest, and a receiving sensor placed on the particle-counter device. A receiving sensor communicates a new position when a particle counter is not replaced at its origination point.

9 Claims, 3 Drawing Sheets

RFID SYSTEM FOR IDENTIFYING LOCATION OF SENSORS/INDICATORS

This is a non-provisional application claiming priority to provisional patent application No. 61/041,492 filed on Apr. 1, 2008.

FIELD OF THE INVENTION

The present invention relates to a system of identifying the source location of particle counter data and automatically updating that source as the location of the particle counter device changes.

BACKGROUND OF THE INVENTION

In the process of creating semiconductors, particle counters are used to aid in the establishment of a closed environment. As is the case with all devices, there comes a time to replace or calibrate these particle counting devices. Several problems can arise when these instruments are moved out of their physical location. A common way to identify a machine is to use a device address, showing that device A belongs in room A, device B in room B, etc. This way, when reporting on particle contamination, it is easy to identify the amount of particles coming from each specific room. A problem with this method arises when machines are moved and then replaced in the wrong location. If a particle counting device is labeled at one location but then placed in a different location, it will yield incorrect results to an inspector. Particle contamination problems will not be correctly addressed if the source data for the contamination is inaccurate.

With some instruments, the need to repeatedly take measurements at several locations are required or mandated. The usual method for using such instruments is to place the instrument at a pre-defined location, enter the location into the instrument, and then collect the data. The problem with this is the demand for the operator to update the location at which the data is collected before each use so that the data is mapped to the correct location. This method is not only inconvenient, but allows many opportunities for user error.

There is a need for a sensor/indicator system that allows machines to be moved, placed in a different location, and automatically updated with the new location of where the data is being collected. By using a tag at each pre-defined location and a reader built into the instrument, this process can be automated to assure accurate recording of data at the locations prescribed.

SUMMARY OF THE INVENTION

The present invention displays a system for allowing a particle counting device to automatically update its data source when it is removed from one location and replaced in a new one. The present invention includes a transmitting sensor that would be placed at the location of interest, as well as a receiving sensor that would be placed on the particle counter itself. These sensors would interact in order to identify which particle counter is present and active at each specific location. An observer will be assured that the particle-counting device is truly reporting from the stated location.

A preferred embodiment of the current invention would use RFID tags placed at the locations of interest and RFID readers built into the instrument.

DETAILED DESCRIPTION OF THE INVENTION

The present invention is intended for use when multiple particle-counting devices are being used in multiple locations but are reporting back to a mutual database. The database may be in communication with a server or computer to store such data. The present invention, preferably, calls for placing a transmitting sensor in each location of interest and a receiving sensor on each individual particle-counting device. The figures represent various embodiments of the present invention relating to location tagging when sensors are moved to different locations.

Figure 1:
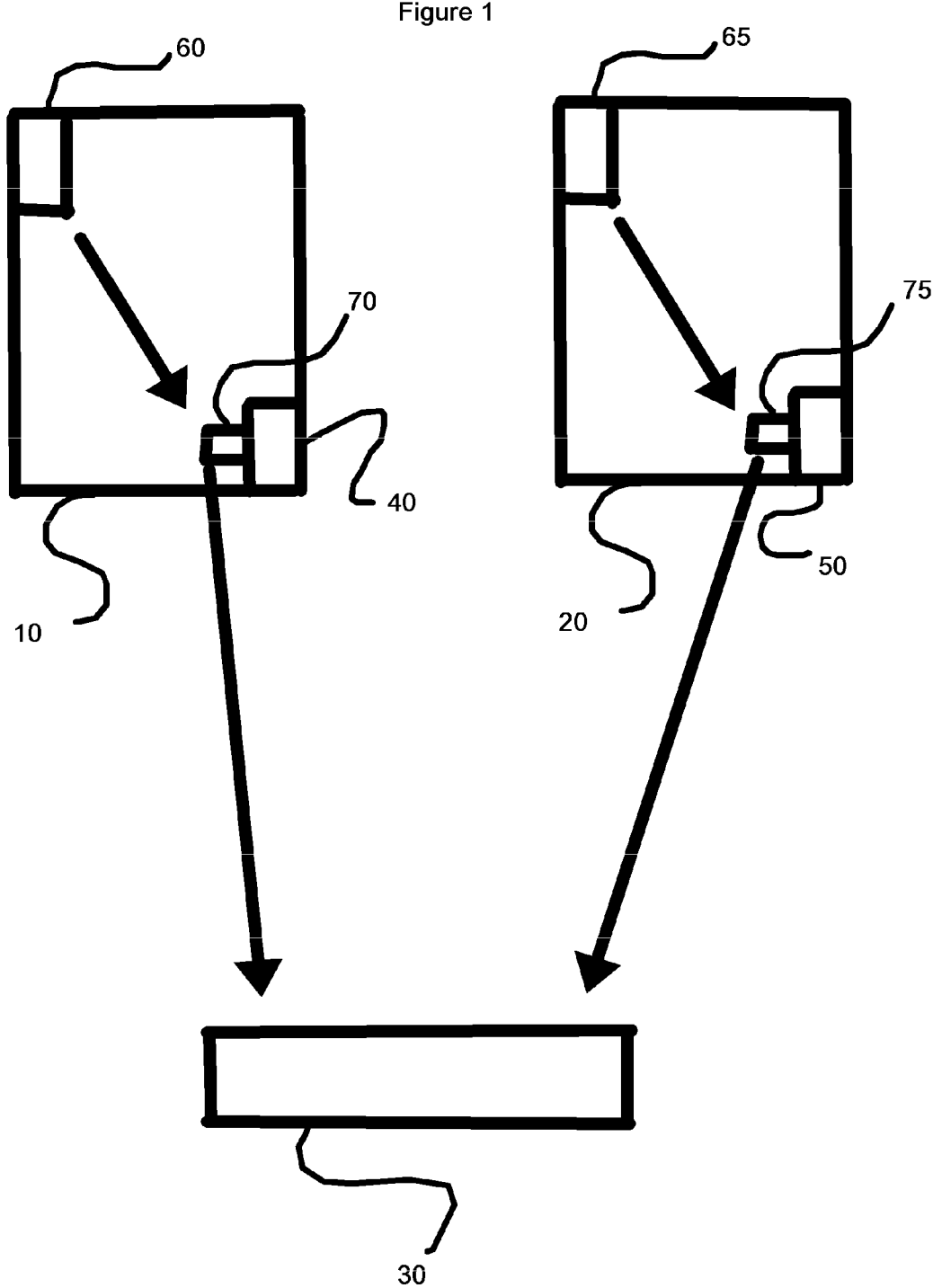
FIG. 1 is a flow chart of the present invention.

FIG. 1 illustrates one embodiment of the present invention. Particle-counting device 1 (40) is placed in room 1 (10), while particle-counting device 2 (50) is placed in room 2 (20). A transmitting sensor 1 (60) is placed in room 1 (10) and a transmitting sensor 2 (65) is placed in room 2 (20) and preferably wired to, or in some way configured to communicate with, the database with their own unique information. A receiving sensor 1 (70) is placed on particle-counting device 1 (40) and a receiving sensor 2 (75) is placed on particle-counting device 2 (50). If particle-counting device 1 (40) is originally in room 1 (10), the transmitting sensor 1 (60) would interact with the receiving sensor 1 (70) and report back to the reporting database (30) that any particles counted by particle-counting device 1 (40) are coming from the location of room 1 (10). If particle-counting device 2 (50) is originally in room 2 (20), the transmitting sensor 2 (65) would interact with the receiving sensor 2 (75) and report back to the reporting database (30) that any particles counted by particle-counting device 2 (50) are coming from the location of room 2 (20).

If the particle counting devices are removed from their respective rooms for any purpose, such as cleaning, and particle counting device 1 (40) is then erroneously placed in room 2 (20) it would not pose a problem. Transmitting sensor 2 (65) in room 2 (20) would then engage receiving sensor 2 (75) on particle counting device 1 (40), and would update the reporting database (30) that any particles being counted by particle counting device 1 (40) are now coming from room 2 (20). It is preferred that at least one foot of space be provided between particle counting device 1 (40) and particle counting device 2 (50) to prevent particle counting device 1 (40) and particle counting device 2 (50) from erroneously detecting transmitting sensor 2 (65) and transmitting sensor 1 (60), respectively, when particle counting device 1 (40) and particle counting device 2 (50) should actually be detecting transmitting sensor 1 (60) and transmitting sensor 2 (65).

The preferred embodiment of the present invention is to have receiving sensor 1 (70) and receiving sensor 2 (75) mounted to particle counting device 1 (40) and particle counting device 2 (50), respectively. Transmitting sensor 1 (60) and transmitting sensor 2 (65) would be mounted to some fixed location (i.e. a wall) in room 1(10) and room 2 (20), respectively.

It is contemplated that either passive or active RFID tags could be employed in the present invention. Thus, while the preferred embodiment of the present invention has been described with transmitting sensor 1 (60) and receiving sensor 1 (70), it should be understood that the transmission and receiving duties could be reversed depending on the RFID tag used.

Figure 2:
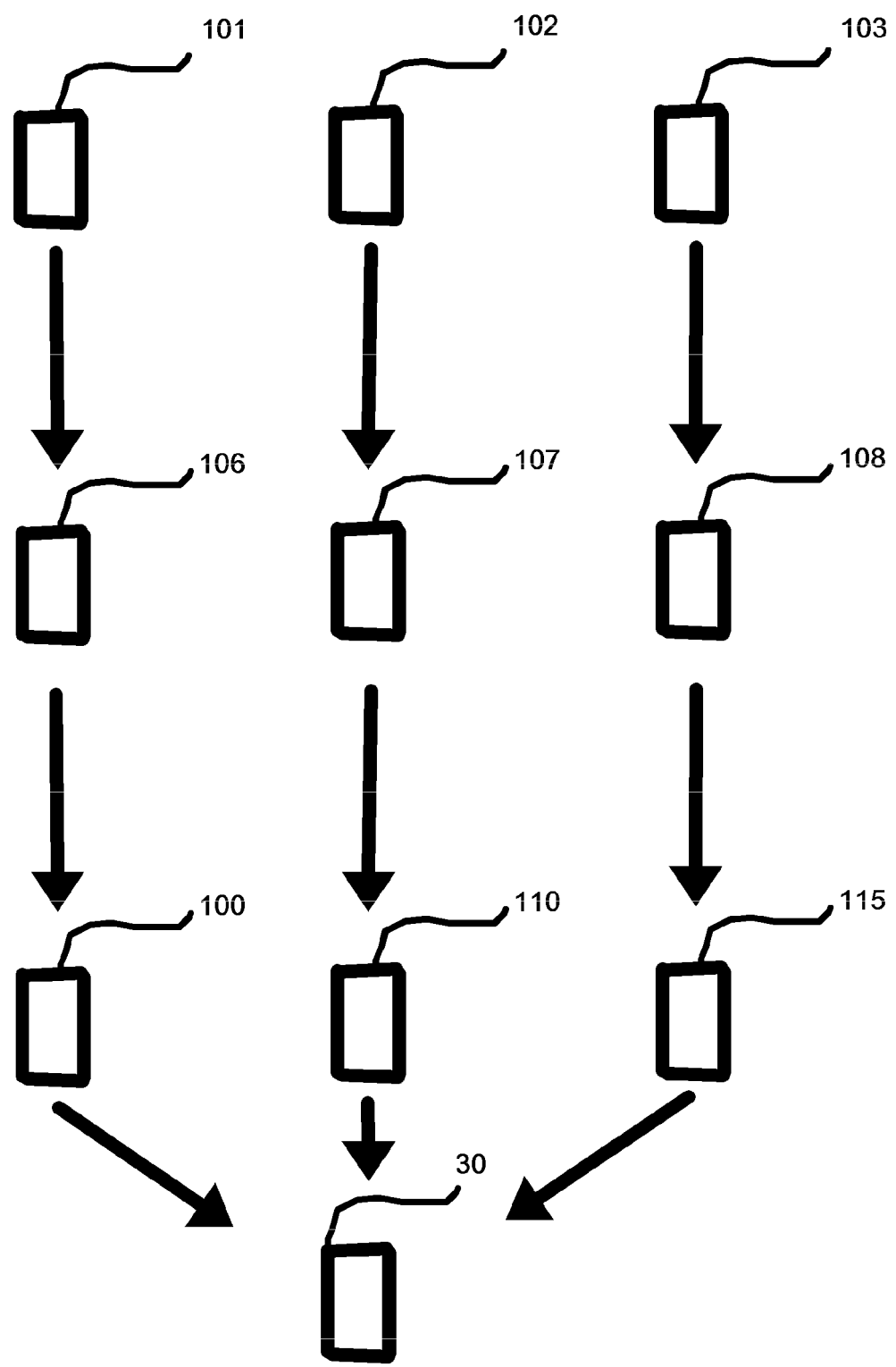
FIG. 2 is a flow chart of an alternate embodiment of the present invention before transmitting sensors are moved.

The present invention is also shown in FIG. 2. Tag 1 (101), tag 2 (102), and tag 3 (103), are positioned in distinct rooms or environments. Tag 1 (101), tag 2 (102), and tag 3 (103) are fixed in certain locations, in other words. Transmitting sensor 3 (106), transmitting sensor 4 (107), and transmitting sensor 5 (108) engage tag 1 (101), tag 2 (102), and tag 3 (103), respectively to determine in which locations transmitting sensor 3 (106), transmitting sensor 4 (107), and transmitting sensor 5 (108) are located in. Next, data stream 1 (100) is transmitted with data from transmitting sensor 3 (106); data stream 2 (110) is transmitted with data from transmitting sensor 3 (107); and data stream 3 (115) is transmitted with data from transmitting sensor 3 (108). All data streams (100, 110, 115) are transmitted to the reporting database (30). In short, a tag tells a transmitting sensor where the transmitting sensor is; and then a data stream is sent with information from a particle counter (connected to or incorporated with the transmitting sensor) to a reporting database. In this way, the reporting database gets reliable particle counting information from a transmitting sensor in a known location.

Figure 3:
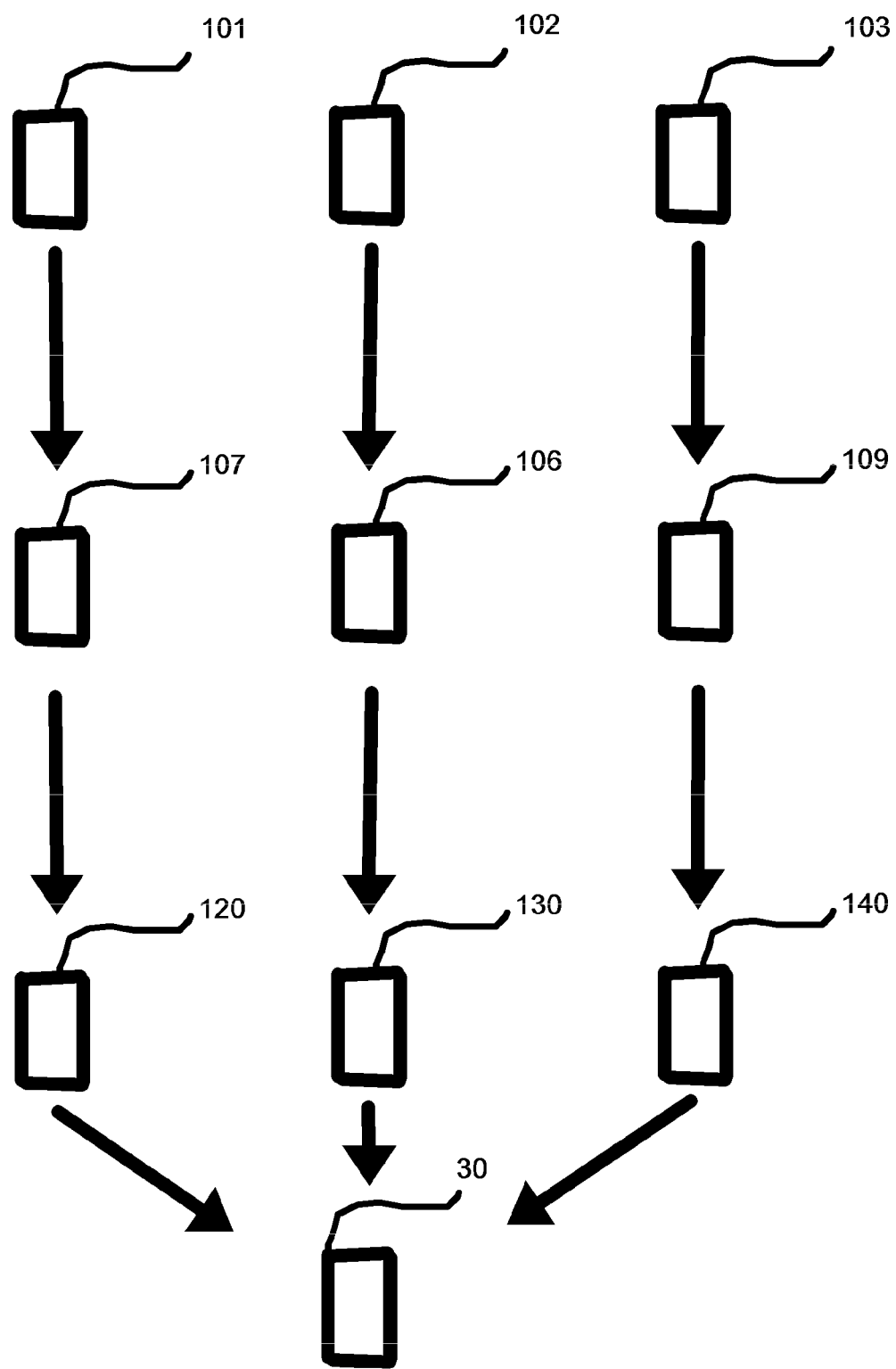
FIG. 3 is a flow chart of an alternate embodiment of the present invention after transmitting sensors are moved.

FIG. 3 shows how the present invention operates when transmitting sensors (connected to or incorporated with particle counters) change locations. As shown in FIG. 3, tag 1 (101), tag 2 (102), and tag 3 (103) are fixed in certain locations just as in FIG. 2. The tags (101, 102, 103) do not move. However, transmitting sensor 3 (106) has moved to the location near tag 2 (102). Further, transmitting sensor 4 (107) has moved to the location near tag 1 (101). Lastly, transmitting sensor 5 (108) has been completely removed and replaced with transmitting sensor 6 (109). Just as before though, the present invention works to provide reliable particle counting information from distinct locations. As shown in FIG. 3, transmitting sensor 4 (107), transmitting sensor 3 (106), and transmitting sensor 6 (109) engage tag 1 (101), tag 2 (102), and tag 3 (103), respectively, to determine in which locations transmitting sensor 4 (107), transmitting sensor 3 (106), and transmitting sensor 6 (109) are located in.

Next, data stream 4 (120) is transmitted with data from transmitting sensor 4 (107); data stream 5 (130) is transmitted with data from transmitting sensor 3 (106); and data stream 6 (115) is transmitted with data from transmitting sensor 6 (109). All data streams (120, 130, 115) are transmitted to the reporting database (30) via conventional means. In short, a tag tells a transmitting sensor where the transmitting sensor is; and then a data stream is sent with information from a particle counter (connected to or incorporated with the transmitting sensor) to a reporting database. In this way, the reporting database gets reliable particle counting information from a transmitting sensor in a known location.

It should be understood that any and all communication between the various numbered items described above is accomplished by conventional means.

The invention claimed is:

1. A system for identifying location of sensors and indicators, comprising:
    placing a first particle-counting device into a first room;
    placing a second particle-counting device into a second room;
    placing a first transmitting sensor into the first room;
    placing a second transmitting sensor into a second room;
    configuring the first transmitting sensor and the second transmitting sensor to communicate with a database, the database containing information unique to the first transmitting sensor and the second transmitting sensor;
    placing a first receiving sensor on the first particle-counting device;
    placing a second receiving sensor on the second particle-counting device;
    communicating between the first transmitting sensor and the first receiving sensor when the first particle-counting device is originally in the first room, such communication including reporting back to the database that any particles counted by the first particle-counting device are coming from a location of the first room;
    communicating between the second transmitting sensor and the second receiving sensor when the second particle-counting device is originally in the second room, such communication including reporting back to the database that second room;
    allowing the second transmitting sensor in the second room to engage receiving on the first particle-counting device and update the database that any particles being counted by the first particle-counting device are now coming from the second room, such action occurring when the first particle-counting device is erroneously placed in the second room;
    allowing the first transmitting sensor in the first room to engage receiving on the second particle-counting device and update the database that any particles being counted by the second particle-counting device are now coming from the first room, such action occurring when the second particle-counting device is erroneously placed in the first room;
    providing at least one foot of space between the first particle-counting device and the second particle-counting device;
    allowing for additional transmitting sensors, additional particle counting devices, and additional receiving sensors to be placed into respective rooms and to communicate with the database;
    positioning RFID tags into the first room, the second room and the respective rooms in fixed locations;
    engaging the first transmitting sensor, the second transmitting sensor and the additional transmitting sensors with the RFID tags placed in the first room, the second room and the respective rooms to determine in which locations the first transmitting sensor, the second transmitting sensor and the additional transmitting sensors are located.
    transmitting data to the database via data streams from the first transmitting sensor, the second transmitting sensor and the additional transmitting sensors, the data streams containing information from the first particle-counting device, the second particle-counting device and the additional particle-counting devices; and
    informing the first transmission sensor, the second transmission sensor and the additional transmission sensors via the RFID tags of a location of the first transmission sensor, the second transmission sensor and the additional transmission sensors, followed by sending the data stream to the database.

2. The system of claim 1, further comprising preventing the first particle-counting device and the second particle-counting device from erroneously detecting the second transmitting sensor and the first transmitting sensor 1, respectively, when the first particle-counting device and the second particle-counting device should actually be detecting the first transmitting sensor and the second transmitting sensor.

3. The system of claim 1, further comprising mounting the first receiving sensor to the first particle-counting device.

4. The system of claim 1, further comprising mounting the second receiving sensor to the second particle-counting device.

5. The system of claim 1, further comprising mounting the first transmitting sensor to a fixed location in the first room.

6. The system of claim 1, further comprising mounting the second transmitting sensor to a fixed location in the second room.

7. The system of claim 1, further comprising employing a passive RFID tag.

8. The system of claim 1, further comprising employing an active RFID tag.

9. The system of claim 1, further comprising communicating data between the database and a server.

\* \* \* \* \*